United States Patent [19]

Weman

[11] 4,039,158
[45] Aug. 2, 1977

[54] BALL ACTUATED INERTIA DEVICE

[75] Inventor: Per Olaf Weman, Haslah, Germany

[73] Assignee: Sigmatex, A.G., Basel, Switzerland

[21] Appl. No.: 559,297

[22] Filed: Mar. 17, 1975

[51] Int. Cl.² .................. A62B 35/00; B65H 75/48
[52] U.S. Cl. .............................................. 242/107.4 A
[58] Field of Search ............... 242/107.4 A; 297/388; 280/744–747

[56] References Cited

U.S. PATENT DOCUMENTS

| 3,873,042 | 3/1975 | Weman | 242/107.4 A |
| 3,901,461 | 8/1975 | Stephenson et al. | 242/107.4 A |

FOREIGN PATENT DOCUMENTS

| 1,817,383 | 7/1969 | Germany | 242/107.4 A |

Primary Examiner—Stanley N. Gilreath
Assistant Examiner—John M. Jillions
Attorney, Agent, or Firm—Jonathan Plaut; Ernest D. Buff

[57] ABSTRACT

A belt winder with a quick-locking vehicle inertia sensitive action including a ball and tipping member which can be brought into operative position in any mounting position in space.

4 Claims, 10 Drawing Figures

BALL ACTUATED INERTIA DEVICE

The invention relates to a belt winder for vehicles with quick-action locking means, comprising a locking mechanism arranged between the housing of the winder and a winding shaft for the safety belt, and further comprising an inert mass in the form of a ball which is mounted in a pocket, open at one side, in a mounting support and which triggers off or brings about the locking action when the vehicle accelerates in at least one of the three direction in space.

Various belt winders with locking means are known — also known as retractors or automatic winders — in which the inert mass is either a pawl, a pendulum or a ball. Centrifugal force brings the pawl or ball into engagement with a circular locking member, where there are two alternatives: either, in the case of direct locking, the entire braking force is passed through the inert mass and the locking member; or, in the case of indirect locking, a force is passed through the inert mass at least to brake either the locking member, in the form of a wheel, or the member holding the inert mass. It is also known for the inert mass to be mounted so that it can move in two — and in a few constructions even in three — directions in space. Thus, a blocking or locking action will either be triggered off by the movement of the inert mass relative to the pocket holding it, or will be brought about by the action of the inert mass itself.

In some winders these types of locking means, which respond to impact, in one of the three directions in space, with the vehicle carrying the winde, are provided in addition to types of locking means which respond to rapid unwinding of the safety belt.

For example, a quick-locking winder of the above type is known, wherein a release mechanism with a ratchet wheel is provided with a braking device. The ratchet-wheel is coupled to the locking mechanism with limited slip and, braked both by the inertia of the ratchet-wheel when there is abrupt pulling on the safety belt and also by the braking device triggered off by a pendulum when the vehicle accelerates in any direction in space, locks the locking mechanism even when there is slow pulling. In this known winder the locking means comprises a toothed segment, which is mounted eccentrically on a disc fixed to the winding shaft for the safety belt, which can turn in a toothed rim fixed to the housing and which can be pivoted into engagement with the toothed rim in order to lock the winding shaft. When there is relative movement between the above-mentioned ratchet-wheel and the disc fixed to the winding shaft, in the direction in which the belt is unwound, the ratchet engages in the toothed rim and, bearing against it, pivots the toothed segment to engage in the rim. The special feature of this known apparatus is the Cardan suspension of a counter weight at its center of gravity, in which the actual pendulum is mounted. This is intended to compensate for the effect of transverse and longitudinal inclinations of the vehicle.

A disadvantage of the known winder is that the compensating effect just mentioned can only take place to a certain extent, in practice up to a pivoting angle of about 5 to 10. Another disadvantage is that the known apparatus has to be arranged so that the hollow shaft lying along the main axis of the winder, around which the safety belt is wound, is parallel with the longitudinal axis of the vehicle. This makes it quite difficult to fit the winder in some types of vehicle.

In the design of new types of bodies for vehicles the tendency is to depart more and more from the square box shape. There is thus a demand for belt winders to be mounted on inclined parts of a vehicle.

The possibility of arranging the winder in the back-rest of the vehicle has also been considered.

It is obviously not always possible or desirable to fix the winder to a horizontal or vertical plane in the vehicle. Not only at the door, probably the commonest place for mounting winders, but also at the edge of the chassis floor there are inclined surfaces and curves where a winder could theoretically be fixed provided that it could operate in the inclined position involved. The known safety belt winder, described at the beginning in which the hollow shaft has to be parallel with the longitudinal axis of the vehicle, although it allows for adjustment in a plane determined by the installation of the winder, does not allow for any adjustment in other planes.

The aim of the invention is therefore to improve the belt winder of the type mentioned at the beginning, so that it is strong and simple in construction and can be arranged in any position in space.

According to the invention this is achieved, in that the mounting support with the pocket, open at one side, for the inert mass, is in the form of an adjusting cylinder, which is arranged in a ring mount so that it can rotate about its longitudinal axis and be arrested, the ring mount being adapted to rotate about an axis perpendicular to the longitudinal axis of the adjusting cylinder, and to be arrested. The great advantage of the measures taken by the invention is that the new safety belt winder can be mounted at any inclination to the vertical, without any parts of the winder having to be replaced or exchanged. Hence, the apparatus according to the invention can be adapted without difficulty to the conditions in any vehicle. For the manufacturer this has a considerable economic advantage, since a single product can be made in large quantities and installed in many different types of vehicle and body designs without any special models having to be made. As the winder can be used without alteration in all types of vehicles, e.g. in the motor vehicle and aircraft industry, the manufacturer of this mass produced article obviously has cost advantages which are by no means inconsiderable. Even if there are different regulations as to responding sensitivity in another country — and regulations are known to vary often from country to country at present — even slight variations can produce the desired adaptation without the whole design being changed. This will be further explained below.

In practice the handling of the belt winder according to the invention means that one must always put the above-mentioned longitudinal axis of the adjusting cylinder into a horizontal plane, regardless of the mounting position. If this has been done (a) by turning the ring mount and (b) by turning the adjusting cylinder in the ring mount, then the requisite responding conditions will obtain for the winder, pre-adapted to the regulations of the country in question. Use of the adjustability provided by the invention thus means that, for any vehicle manufacturer, the winder according to the invention only has to be adjusted once — and this might be done by the manufacturer of the winder — after which the winder can be installed in the desired type of vehicle without any further changes. The manufacturer has the considerable advantage of not having to store different spares or exchange parts for different types of vehicles.

In accordance with the invention it is desirable to have two adjusting cylinders arranged in the ring mount, in axial alignment with one another and so that they can be turned and blocked. The open ends of the individual pockets preferably face towards one another. The above-mentioned longitudinal axis of the adjusting cylinder then obviously extends in one line with the longitudinal axis of the other adjusting cylinder. In this embodiment the adjusting cylinder itself and thus the internal pocket and the inert mass may be articularly simple in construction. The adjusting cylinde is inserted in the ring mount like a kind of stopper. It could equally be termed a sensing or locking cylinder. However, its most important function is adjustment, i.e. turning the adjusting cylinder or cylinders about the said longitudinal axis, which may be the line joining the two cylinders, in order to set the axis at 90° to the vertical and so achieve optimum operation of the winder. As already mentioned above, it is not sufficient to set merely the axis, i.e. one line, perpendicularly to the vertical, for any number of planes might extend through the line. Instead, if the winder is to difinitively adjusted, the ring mount must be turned until the plane defined by the said longitudinal axis throught the adjusting cylinder and the axis perpendicular to the plane of the ring mount is set horizontally, i.e. at 90° to the vertical.

It is advantageous, according to the invention, for the adjusting cylinder to be pressed in by means of a snap ring or to be fitted into the ring mount with a press fit. Should a special construction be required for the pocket inside the cylinder, in accordance with the regulations of the country in question, then the adjusting cylinder — the only part of the entire winder — may be substituted by a cylinder with the same external dimensions but with a different pocket in the ring mount. Owing to the above-mentioned features of insertion or the press fit such mounting is extremely simple and takes up little working time.

In an advantageous development of the invention the inert mass is a ball. The included position of the pocket in the adjusting cylinder, i.e. the position at an angle to the horizontal, is a very simple way of forming a kind of slop over which the inert mass, i.e. the ball, can pass merely on receiving a blow or other acceleration. The ball tip is a locking member independent thereof. This type of solution indicates the simplicity of the embodiment.

In another, desirable embodiment, the ball rests on the tipping member and activates it by moving off it and pushing it, and deactivates it by moving back on it.

The simplicity in operating the invention and the simplicity of its construction guarantee good reliability and a cheap mass-produced article, where many different parameters for increasing or reducing the sensitivity of the sensor can be adjusted by exchanging very small components.

Other advantages, features and applications of the invention will become apparent from the description which follows; this refers to the accompanying drawings, in which:

FIGS. 1 - 7 are prior art embodiments of the invention disclosed in U.S. Pat. No. 4,004,571 and owned by the same assignee as this application.

FIGS. 1 to 6 clearly show the shape of the housing 1 of a safety belt winder in the conventional form, wherein (FIGS. 3 to 6) the axis $c$—$c$ coincides with the main axis and thus with the main shaft of the winder, to which the belt strip is attached and about which it can be wound. As the invention is not concerned with the fastening and winding of the belt strip on the main shaft, the torsion spring for biasing the main shaft in the winding-up direction or other details of the blocking means, e.g. for when the belt strip is pulled out at an acceleration which exceeds a predetermined value, whereby a different locking mechanism might come into action, these components will not be described here.

Figure 1:
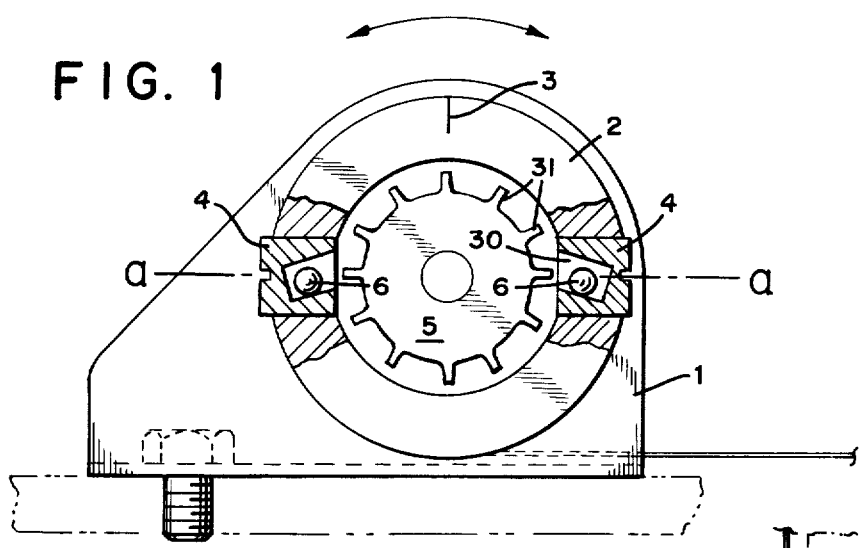
FIG. 1 is a side elevation of a first embodiment of the invention with a ring mount and two adjusting cylinders.
Figure 2:
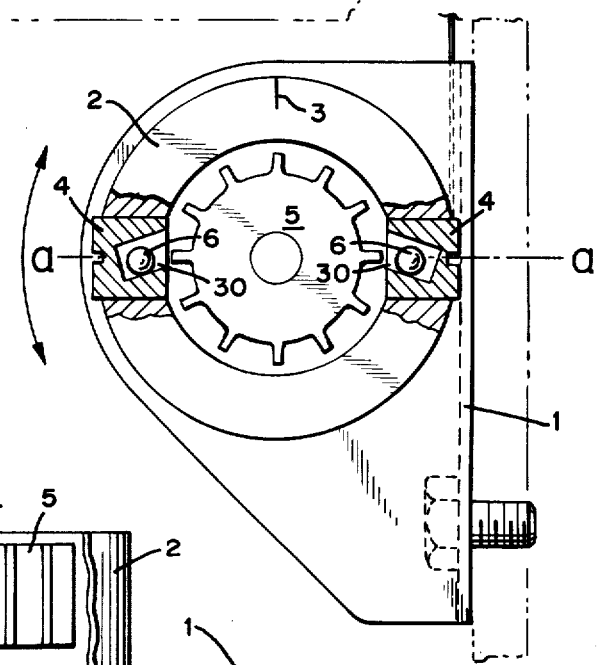
FIG. 2 is the same view as FIG. 1 but with the winder turned through 90° to the left.
Figure 3:
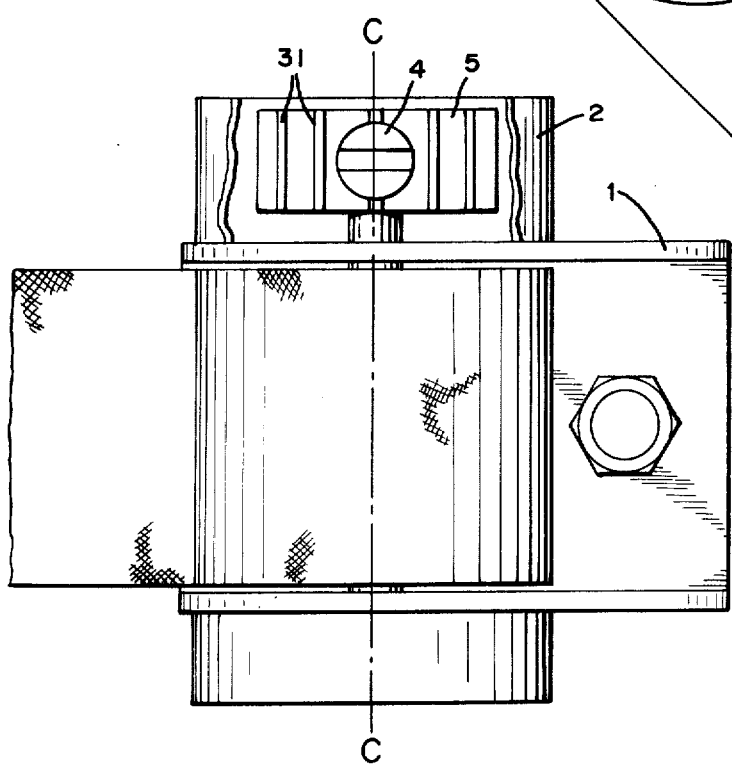
FIG. 3 is a plan view of the winder with the ring mount shown broken away.
Figure 4:
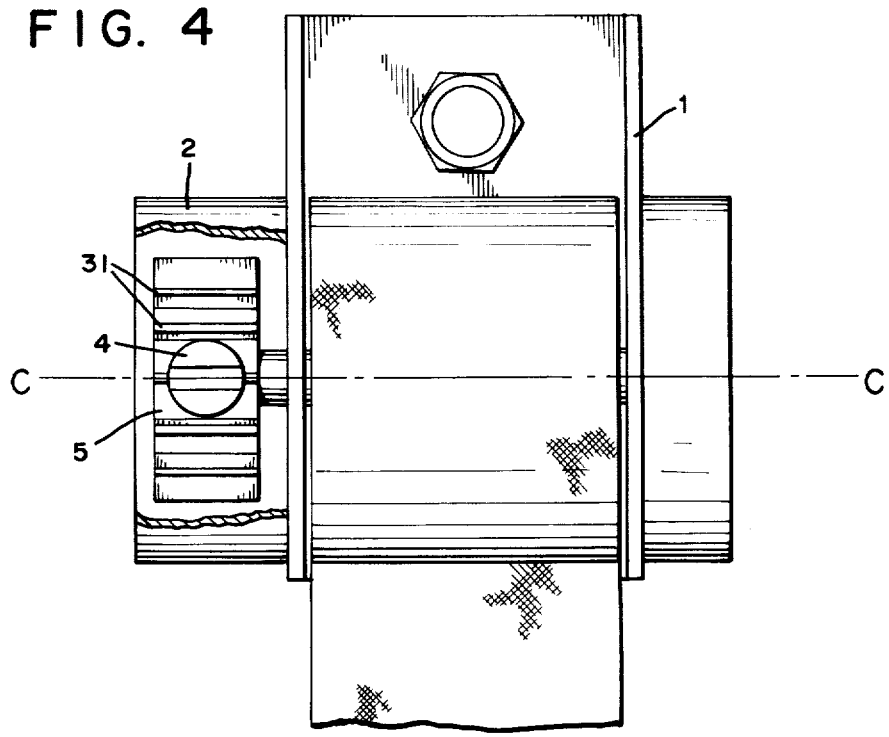
FIG. 4 is a similar view to FIG. 3 but with the apparatus turned anti-clockwise through 90°.

The mounting support 2 is in the shape of a ring as can be seen clearly from FIGS. 1, 2, 5 and 6. In FIGS. 3 and 4, the ring is shown in plan and is in fact cut away to give a better view of the components arranged concentrically therein. In this embodiment, the ring mount 2 is shown without any casing. A housing could of course be provided to cover it, but this is not essential to an explanation of the invention.

A mark 3, e.g. a notch, colour symbol or the like, is provided on the ring mount 2. The purpose of the mark is to give the mechanic easy and appropriate fitting instructions. The mechanic should preferably turn the ring mount 2, which is rotatable about its axis $c$—$c$, unitl (as shown in FIGS. 1, 2, 5 and 6) the line from the mark to the center of the ring mount 2 is at right angles with axis $a$—$a$ (FIGS. 1 and 2).

Adjusting cylinders 4 are inserted in opposite sides of the ring mount 2 with a snug fit. The ouside of each cylinder 4 is provided with a slot to receive a screwdriver or the like. The cylinders are rotatable about the axis $a$—$a$. On the inside of the ring mount 2 the two adjusting cylinders 4 have pockets 30 with their open ends facing towards one another. In the side view shown in FIGS. 1 and 2 the pockets 30 are arranged at an angle to axis $a$—$a$. This angular arrangement provides a slope at the bottom of each pocket 30, at the open end, and the inert mass can only pass over this slope when a sufficiently great impulse is imparted to it. In the embodiment shown in FIGS. 1 to 9, the inert mass is a ball 6.

Inside and concentric with the ring mount 2 is a locking wheel 5 with teeth 31 at its periphery. Although the shape of the teeth varies in the examples shown it does not of itself make any difference; only the upper inclined surface in each of FIGS. 7a, 8, 9a, 10a, etc. as explained with reference to FIG. 7a (sic).

The only essential is that the recesses between the teeth 31 around the periphery of the locking wheel 5 should be spaced from one another at least by a distance equal to the maximum diameter of the ball 6 or differently shaped inert member or to the component of the locking member (to be described later) lying in a peripheral direction.

In FIGS. 1 and 2 it will be noted that the ring mount 2 is rotatable in the direction of the curved double arrow, about axis $c—c$, which extends perpendicularly to the axis $a—a$ of the adjusting cylinder and perpendicular to the plane of the paper in FIGS. 1 and 2. It will also be noted that, although the winder housing is swung from the FIG. 1 to the FIG. 2 position, axis $a—a$ is horizontal in both cases.

The same phenomenon is shown in FIGS. 3 and 4 with the adjusting cylinder 4. If the winder with the housing 1 is swung from the FIG. 3 arrangement into the FIG. 4 position, so that the main shaft $c—c$ is turned anti-clockwise through 90°, the same adjustment conditions for the locking device according to the invention can be obtained, by turning the adjusting cylinder (which is on the opposite side, out of sight) clockwise through 90°. In the pivoting movement shown in FIGS. 3 and 4 the axis $a—a$ of the adjusting cylinder remains at right angles to the plane of the paper in both positions.

For the same of simplicity, we shall first take the case of "direct locking", with the locking wheel 5 rigidly mounted on the main shaft of the winder, located on the line of the axis $c—c$.

Figure 5:
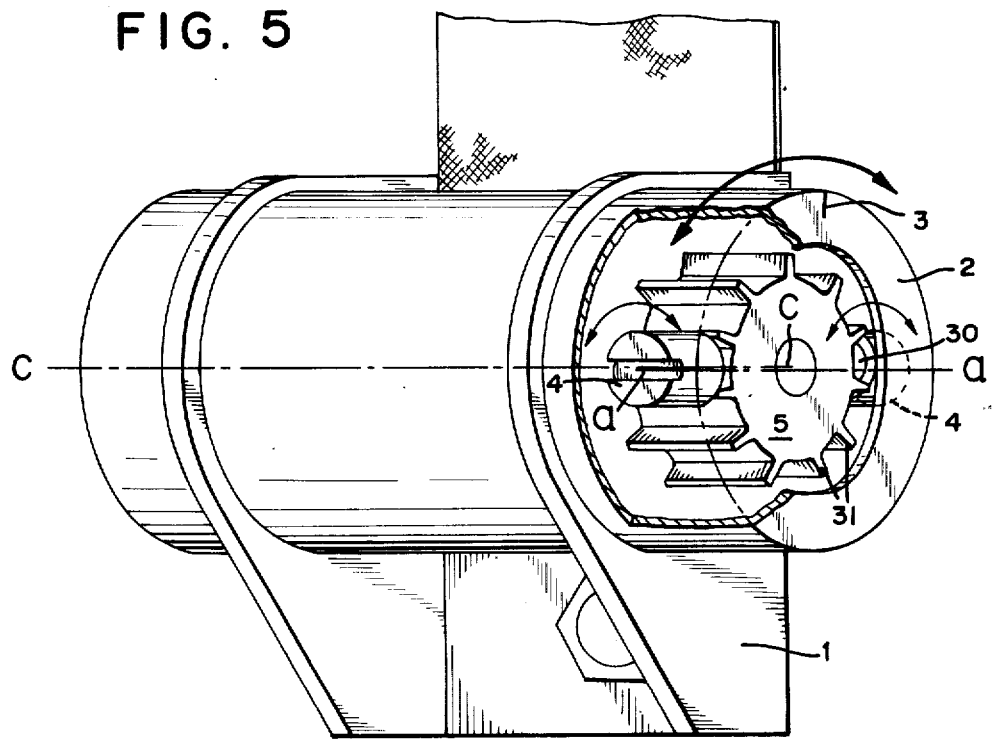
FIG. 5 is a perspective view showing the possible arrangement on a substantially vertical fixing part.

FIG. 5 is a perspective view, to make the action clearer, and again shows how the ring mount 2 and the adjusting cylinder 4 each turn. The large, curved double arrow should be thought of as being arranged transversely to the two small, curved double arrows, for the ring mount 2 is rotatable about the axis $c—c$ while the two adjusting cylinders 4 are rotatable about the axis $a—a$ perpendicular thereto. In the FIG. 5 arrangement one can imagine the belt winder mounted on the vertical side wall or the vertical door lentel of the vehicle.

Figure 6:
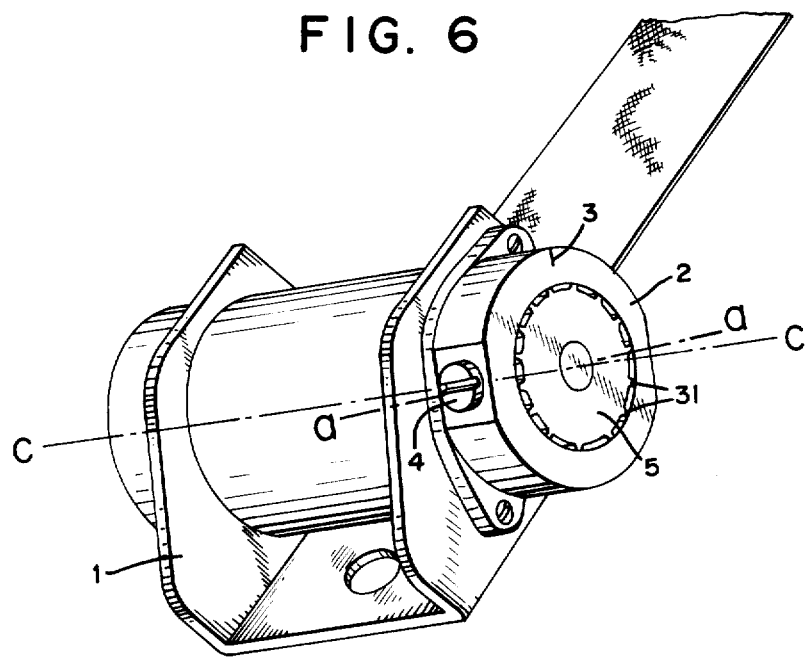
FIG. 6 is a perspective view showing the possible arrangement in a skew position.

FIG. 6 is designed to show the skew position of the winder with the housing 1 in which, despite the angular arrangement, the plane of the sensor is kept vertical in each of the three directions of space. This is achieved firstly by setting mark 3 as described above — pointing to the vertical — through turning the ring mount 2 about the axis $c—c$, and then by turning the two adjusting cylinders 4 e.g. until the slot, acting as a marker, shows the plane defined by the slot and the cylinder axis $a—a$ to be horizontal. The pockets in the adjusting cylinders are then arranged so that impact with the vehicle from any direction will cause the inert member, particularly the ball, to be pushed out of one or other of the opposing cylinders 4.

In FIG. 6 one can imagine the belt winding means as being screwed at the rear to the floor of the vehicle at an inclined part of the body.

We have so far only mentioned the possibility of adjustment and the means for obtaining the desired adjustment. We shall now describe the possibility of a locking action with reference to the above and other embodiments.

Figure 7A:
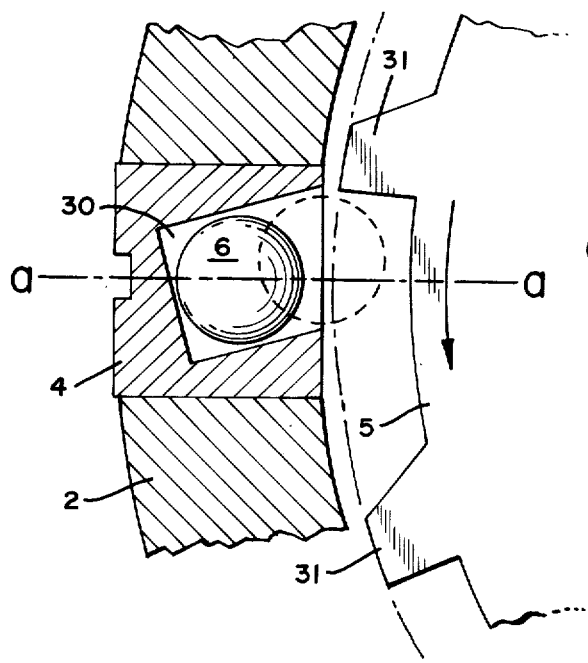
FIG. 7a is a section through part of the embodiment, similar to FIG. 1 but showing only the left adjusting cylinder.
Figure 7B:
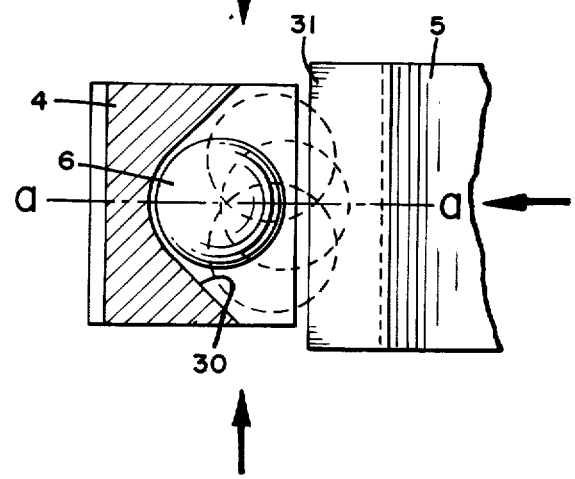
FIG. 7b is a sectional view along a plane defined by the adjusting cylinder axis $a$—$a$ in the direction of the main axis of the winder.

The trough-like shape of the pocket 30 can be seen from FIGS. 7a and 7b. The ball in it, which constitutes the inert mass, has the opportunity either to move laterally out of the rounded part of the pocket 30 or to move out perpendicularly over the slope in the direction of the axis $a—a$ and to arrive in the recess between the teeth on the locking wheel 5. The right hand, dotted line position of the ball 6 is an example of a position which it can assume after a blow from the right. The arrangement is such that the ball 6 either only enters the recess between the teeth as far as its center of gravity, so that it drops back automatically into the pocket when relieved of the load, or such that the ball is pushed back into the pocket by the oblique upper flank of the tooth in question when the locking wheel 5 is wound back by the action of the usual spiral spring (for biasing the belt strip in the winding direction); this might be provided for by raising the base between the teeth 31 on the wheel 5. In any case provision is made for the ball to return to its inoperative position in the pocket 6 after the locking process, either by gravity, by an impulse or by turning.

When the ball 6 is in the position shown in broken lines in FIGS. 7a and 7b it is impossible for the teeth to turn any further anti-clockwise, i.e. down past the adjusting cylinder 4. In the case of the direct locking the force is dissipated from the external tip of the tooth on the wheel 5, through the ball, the blocked or arrested (or possibly even fused) adjusting cylinder 4 and the ring mount 2 to the housing. A special embodiment, for example, is based on the idea that once the ring mount and adjusting cylinder have been adjusted both should be definitively secured by driving in a pin. This can be done when the winding means has been mounted on the floor of the vehicle or on the body, since the user of the vehicle will hardly remove the winding means himself.

In FIG. 7b the right hand arrow pointing to the left, shows the direction of an impact which would make the ball 6 move into the dotted line position along the axis $a—a$. The two arrows at right angles thereto show the directions of impact which would shift the ball 6 into the other two broken line positions.

The invention has thus far been described with relation to devices of the prior art application already mentioned. That application includes embodiments such as FIG. 9a of that application, in some respects similar to the embodiments of this invention described with relation to FIGS. 8 and 9 hereafter, but the embodiments of FIGS. 8 and 9 are patentable thereover, which will become apparent on a reading of the following disclosure.

Figure 8:
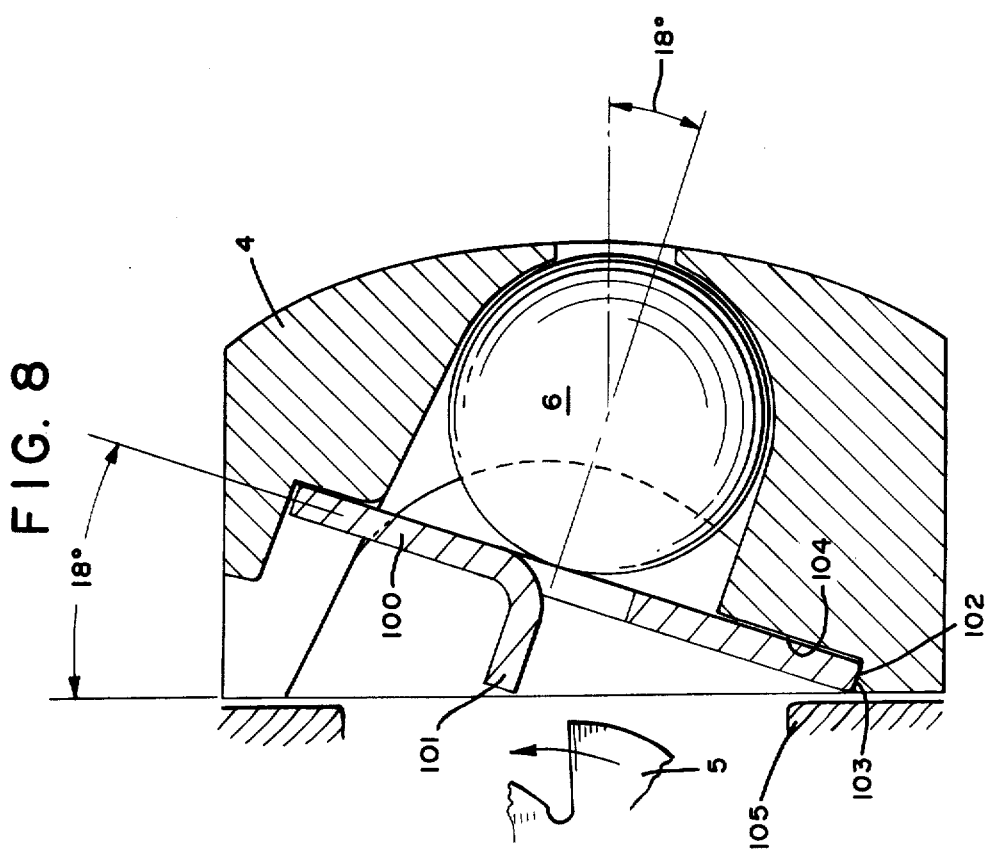
FIG. 8 is a view similar to FIG. 7a but of a different embodiment.

In FIG. 8, the adjusting cylinder 4 is shown mounted at an angle such as 18° to the horizontal so that the ball 6 will rest on the cylinder 4 in its natural position. On the required inertial force occurring the ball 6 moves towards the sprocket 5 and tips the tipping member 100 so that it locks with the sprocket 5 as through the detent 101 coming in contact with the teeth of sprocket 5. The tipping member 100 is mounted so as to pivot on its lower inner edge 102 against the cylinder 4. The cylinder is provided with a flat surface 103 and a shoulder 104 for the tipping member to rest against in its rest position and for the tipping member to rotate against when it moves to its locking position. A portion of the retractor body 105 forms a stop to keep the tipping member from moving too far in its locked position.

The special advantage of this construction is that the tipping member is freely mounted between the cylinder 4 and the retractor body 105 and can be loaded by simply installing it against the cylinder just after the ball 6 is placed into the cylinder and the unit is then loaded to the retractor body.

Figure 9:
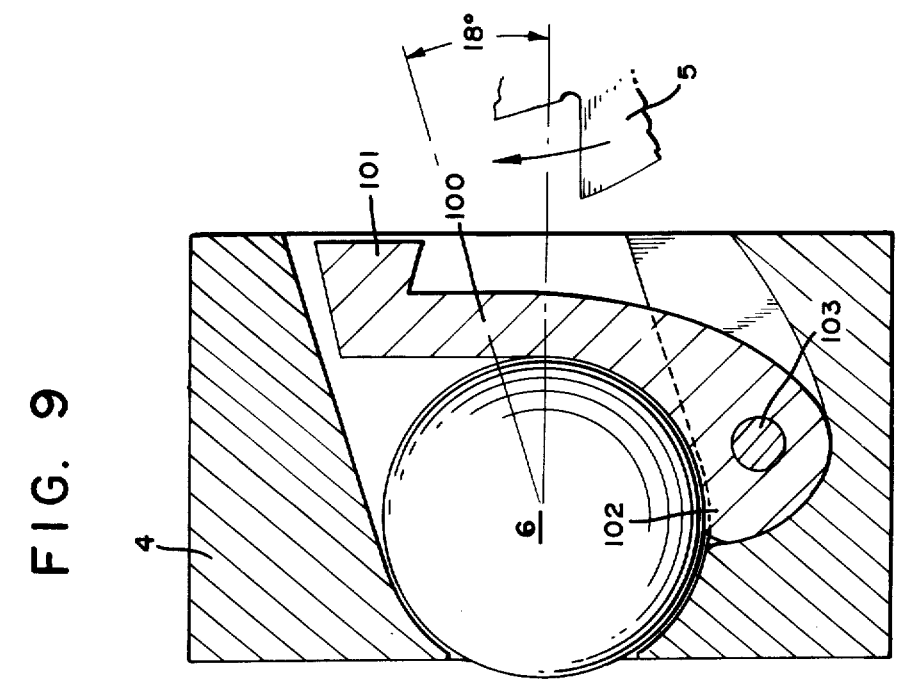
FIG. 9 is a view similar to FIG. 8a of a different embodiment.

In FIG. 9 the ball 6 rests in the pocket of the cylinder 4 in the same manner as in FIG. 8 and at a similar angle to the horizontal to maintain the ball in the pocket.

In FIG. 9, however, the ball rests on an end of the tipping member 100 opposite to the end with the detent 101 which engages the ratchet so that the ball releases it by moving its weight off the base 102 of the tipping member 100. The tipping member is pivoted to the cylinder at 103 such that its weight will cause it to tip to the locking position in engagement with the ratchet. It is the weight of the ball alone which keeps it in unlocked position. Movement of the ball to the position in phantom in FIG. 7b moves the ball off the base 102 and allows the tipping member 100 to engage the ratchet. The tipping member 100 is concave shaped in the portion 90 coming into contact with the ball when it leaves its rest position to cradle the ball and aid movement of the tipping member. On cessation of the inertia condition that causes the ball to move off the base 102 in the cylinder 4 the ball returns to its position on the base of the cylinder 4 (due to the angled orientation of the cylinder and bears its weight once again on the base 102 to move the tipping member to its unlocked position.

The embodiment of FIG. 9 has the special advantage of a tipping member which normally stays in its locking position except when the ball which rests thereabove is in its rest position. The result is that the device is positively acting with movement of the ball causing both locking and unlocking.

We claim:

1. A belt winder for a safety belt for vehicles with quick-action locking means, comprising a housing having a winding shaft, a locking mechanism arranged between the housing and the winding shaft, a mounting support having the shape of a ring and including a pair of adjusting cylinders, each of the cylinders having formed therein a pocket open at one side, each said pocket having a bottom and being formed at an angle to the axes of said cylinders, means on said ring for selectively mounting each said cylinder for rotation to maintain a portion of the bottom of each said pocket below the open end of each said pocket when said cylinders are in a horizontal plane, means mounting said ring for selective rotation on said housing about an axis perpendicular to the longitudinal axis of the adjusting cylinders to maintain said adjusting cylinders in a horizontal plane, and said locking mechanism comprising (1) a locking wheel mounted on said shaft and having a plurality of ratchet teeth, (2) a ball inert mass mounted in the pocket of each of said cylinders and moving within the pocket when the vehicle accelerates in at least one of three directions in space and (3) a tipping member mounted in each said pocket and having a first portion thereof curved to conform to the shape of the ball and a second portion adapted to engage said teeth, said tipping being independent of the ball but moved in response to ball movement in the pocket to bring said second portion into engagement with said teeth to lock the winder shaft.

2. A winder according to claim 1, wherein each pocket of the adjusting cylinders is in the form of a cylinder which is non-parallel with the axes of the adjusting cylinders.

3. A winder according to claim 1, wherein the tipping member has a lower edge pivotally suported by said cylinder adjacent to and between the ball and said teeth.

4. A winder according to claim 1, wherein said second portion of each said tipping member rests under the ball in each pocket when the ball is in rest position.

* * * * *